United States Patent
Watanabe et al.

[11] Patent Number: 6,082,216
[45] Date of Patent: Jul. 4, 2000

[54] SHIFT LEVER APPARATUS

[75] Inventors: Yoshitaka Watanabe; Masaki Fujita, both of Aichi-ken, Japan

[73] Assignee: Kabushiki Kaisha Tokai-Rika-Denki-Seisakusho, Aichi-ken, Japan

[21] Appl. No.: 09/012,734

[22] Filed: Jan. 23, 1998

[51] Int. Cl.[7] ............................. B60K 20/00; G05G 1/04
[52] U.S. Cl. ..................... 74/473.3; 74/473.33; 74/523
[58] Field of Search .................. 74/473.3, 473.33, 74/523; 188/371; 29/525, 451; 403/300

[56] References Cited

U.S. PATENT DOCUMENTS

| | | | |
|---|---|---|---|
| 2,100,642 | 11/1937 | Geyer | 74/473.3 |
| 4,077,275 | 3/1978 | Kluge et al. | 74/473.3 |
| 5,452,623 | 9/1995 | Knight | 74/523 X |
| 5,467,664 | 11/1995 | Wehner | 74/523 |
| 5,579,661 | 12/1996 | Yarnell et al. | 74/523 X |
| 5,680,796 | 10/1997 | Wustenberg et al. | 74/473.33 X |

FOREIGN PATENT DOCUMENTS

| | | |
|---|---|---|
| 9-30281 | 2/1997 | Japan . |
| 9-30282 | 2/1997 | Japan . |
| 9-58288 | 3/1997 | Japan . |
| 9-58289 | 3/1997 | Japan . |

*Primary Examiner*—Thomas R. Hannon
*Assistant Examiner*—Marcus Charles
*Attorney, Agent, or Firm*—Nixon Peabody LLP; Thomas W. Cole

[57] ABSTRACT

A shift lever gripped by a driver for operating the transmission of a vehicle is inserted into a hole of a lever holder. The lever holder is axially supported to the vehicle so as to transmit the operation of the shift lever to the transmission. A plurality of ribs are projected into the holes and when a heavy load acts in the axial direction of the shift lever, the shift lever moves to break the rib. Accordingly, the axial direction load of the shift lever is absorbed.

17 Claims, 4 Drawing Sheets

SHIFT LEVER APPARATUS

BACKGROUND OF THE INVENTION

1. Field of the Invention

The present invention relates to a shift lever apparatus provided with an impact absorbing structure.

2. Description of the Related Art

As shown in FIG. 4, the bottom of a shift lever 102 is inserted and fixed to an insertion hole 110 of a lever holder 104. A bracket 106 formed in the lower end of the lever holder 104 is attached to a cylindrical retainer 112. In a mounting state, a pin 114 is inserted through an axial supporting hole 107 of the bracket 106 and a cylindrical member 113 fixed to the retainer 112 so as to rotate the lever holder 104 around the pin 114 to a width direction of a vehicle. Further, a fixing axis 108 is inserted through the retainer 112, so that the retainer 112 is axially supported. Accordingly, when a shift operation of the shift lever 102 is performed, the retainer 112 is rotated so that a desired shift range can be selected.

However, in this shift lever 102, when a strong force is applied in an axial direction, absorption of this force was poor.

SUMMARY OF THE INVENTION

The present invention is made by taking the above fact into consideration. An object of the present invention is to provide a shift lever apparatus which has an improved absorption of strong forces applied to the shift lever apparatus.

In accordance with the present invention, there is provided a shift lever apparatus for operating the transmission of a vehicle comprising a shift, lever to which an operating force by a driver is input, a lever holder axially supported to the vehicle so as to be connected to the transmission and to which the shift lever is mounted; and a rib which is disposed between the shift lever and the lever holder and which deforms under a pressing force of the shift lever in order to absorb a heavy loads applied to the shift lever from an inner portion of the cabin.

During normal running, heavy loads are not applied to the shift lever, so the rib is not deformed and thus an optional shift range can be selected through shift operation.

When the shift lever receives a strong impact in the axial direction, the lower end of the shift lever presses the rib. Accordingly, the shift lever moves within the inserting hole to the lower portion while deforming the rib. Therefore, the impact received by the shift lever can be absorbed.

DETAILED DESCRIPTION OF THE PREFERRED EMBODIMENT

Figure 1A:
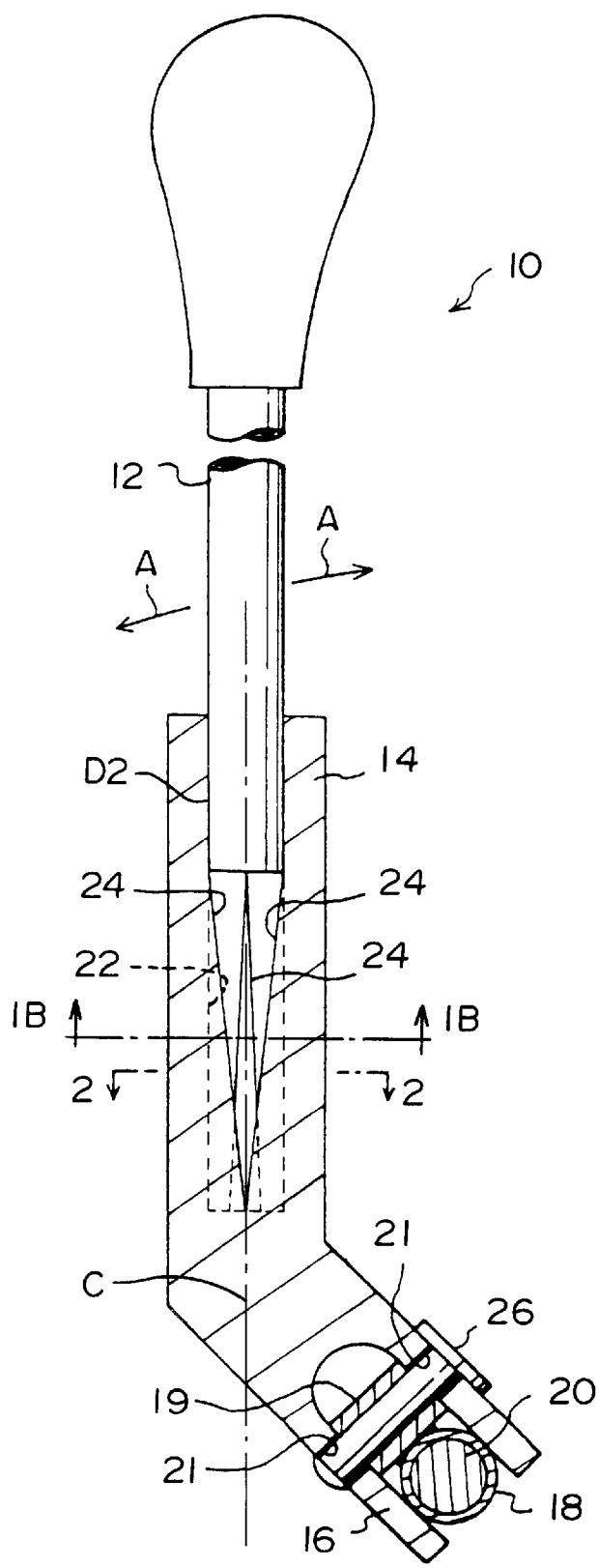
FIG. 1A is a cross sectional view which shows the main parts of a shift lever apparatus in accordance with an embodiment of the present invention.
Figure 1B:
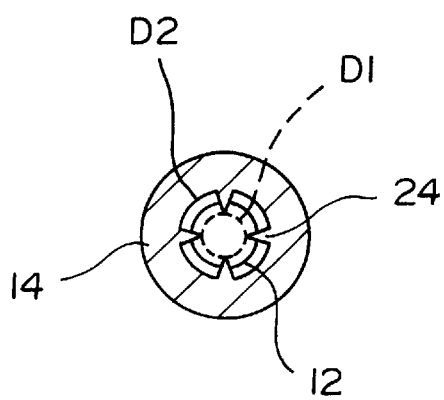
FIG. 1B is a sectional plan view of the shift lever of FIG. 1A along the line 1B—1B.

A main portion of a shift lever apparatus 10 in accordance with an embodiment of the present invention is shown in FIG. 1A The shift lever apparatus 10 includes a shift lever 12 for a shift operation, and a lower end of the shift lever 12 is mounted to a lever holder 14.

The lever holder 14 is bent substantially at a center portion at an obtuse angle. Further, a pair of brackets 16 are provided in the lower end of the lever holder 14 in a projecting manner, a cylindrical retainer 18 is provided at an inner side of the bracket 16. A cylindrical member 19 is fixed to the upper portion of the retainer 18 in a perpendicular direction by welding or the like. In a state of attaching the bracket 16 to the retainer 18, a pin 26 is inserted through an axial supporting hole 21 formed on the bracket 16 and the cylindrical member 19, so that the lever holder 14 can be rotated around an axial line of the pin 26. Accordingly, the shift lever 12 can be rotated around the pin 26 to a width direction of the vehicle.

A fixing axle 20 is inserted through the retainer 18 so that the retainer 18 is axially supported so as to freely rotate the lever holder 14 around the axial line (a direction of an arrow A) of the fixing axle 20. Accordingly, the shift lever 12 can be rotated around the fixing axle 20 to a longitudinal direction of the vehicle.

A control lever (not shown) is projected from there tainer 18 and the pin of the control lever is connected to an automatic transmission through a transmitting mechanism, so as to shift the automatic transmission by an operation of the shift lever 12.

Figure 2:
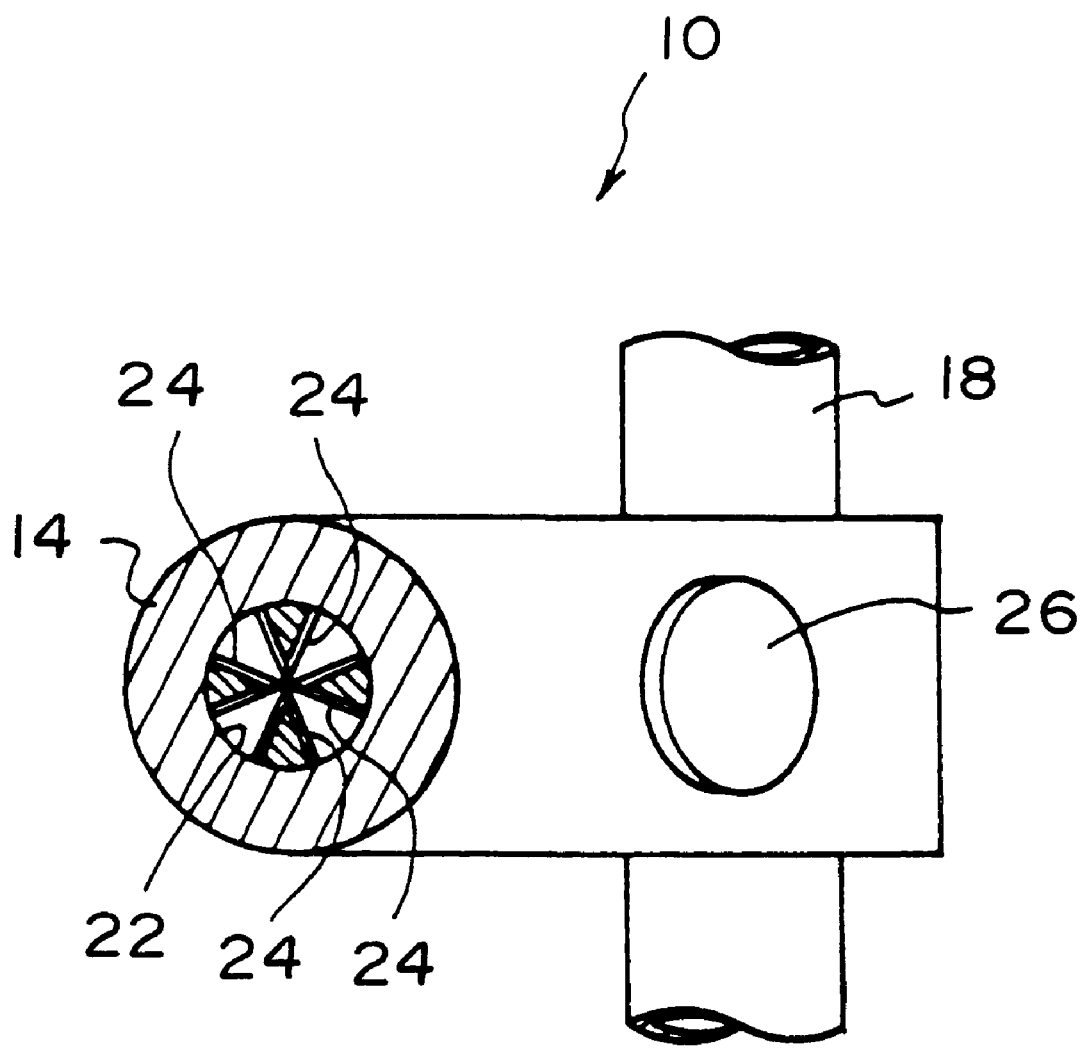
FIG. 2 is a cross sectional view along a line 2—2 of FIG. 1A

An inserting hole 22 is formed in the lever holder 14 in the direction below the upper end and the shift lever 12 is inserted and fixed to a substantially central middle portion in the axial direction of the inserting hole 22. Between a substantially central portion and the lower end in the axial direction of the inner surface of the inserting hole 22, also as shown in FIG. 2, a plurality of (four in the present embodiment) ribs 24 each having a substantially triangular shape in cross section, projecting toward the center of the inserting hole 22 and gradually increasing in projecting height in the direction of the bottom end in a peripheral direction of the inserting hole 22 at a predetermined interval. Since the diameter of the circle connecting the projecting ends of the ribs 24 is smaller than the diameter of the shift lever 12, in a normal state, the lower end of the shift lever 12 is mounted on the upper end of the ribs 24, so that the shift lever 12 does not drop below this position.

Figure 3:
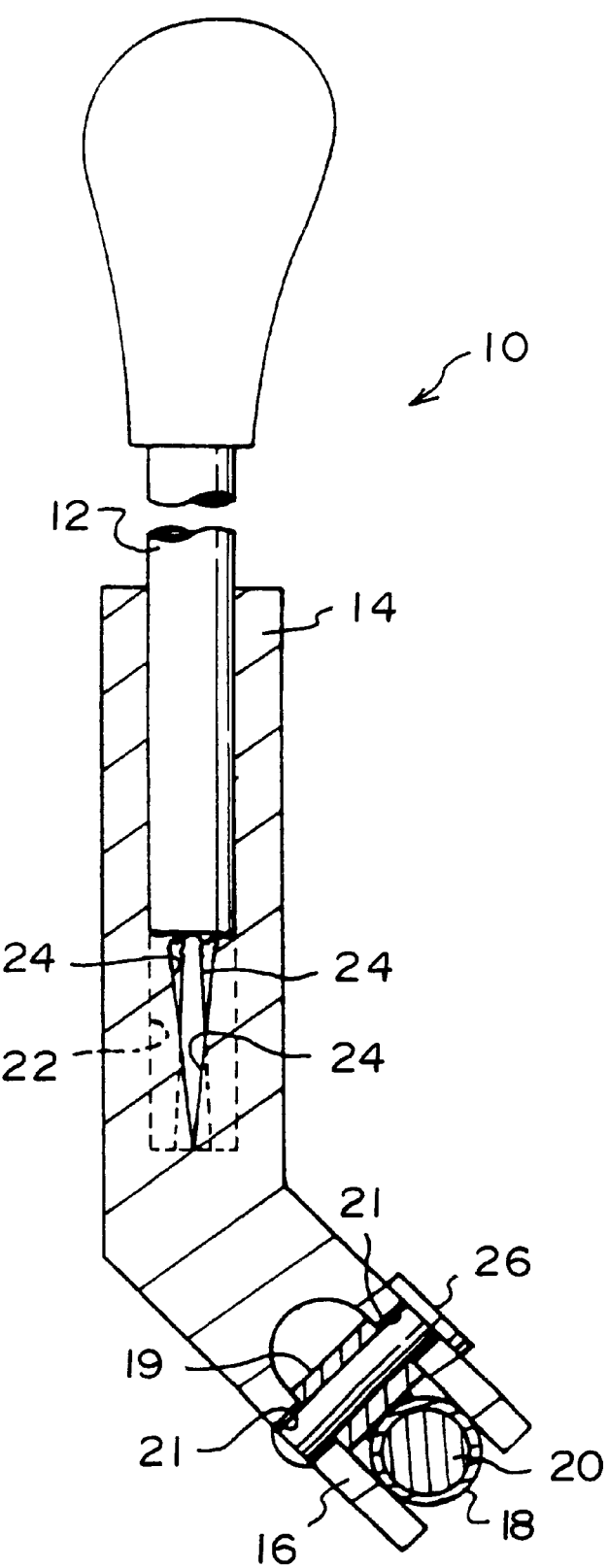
FIG. 3 is a cross sectional view of the main parts showing the state in which a shift lever of the shift lever apparatus in accordance with the embodiment of the present invention receives an impact.
Figure 4:
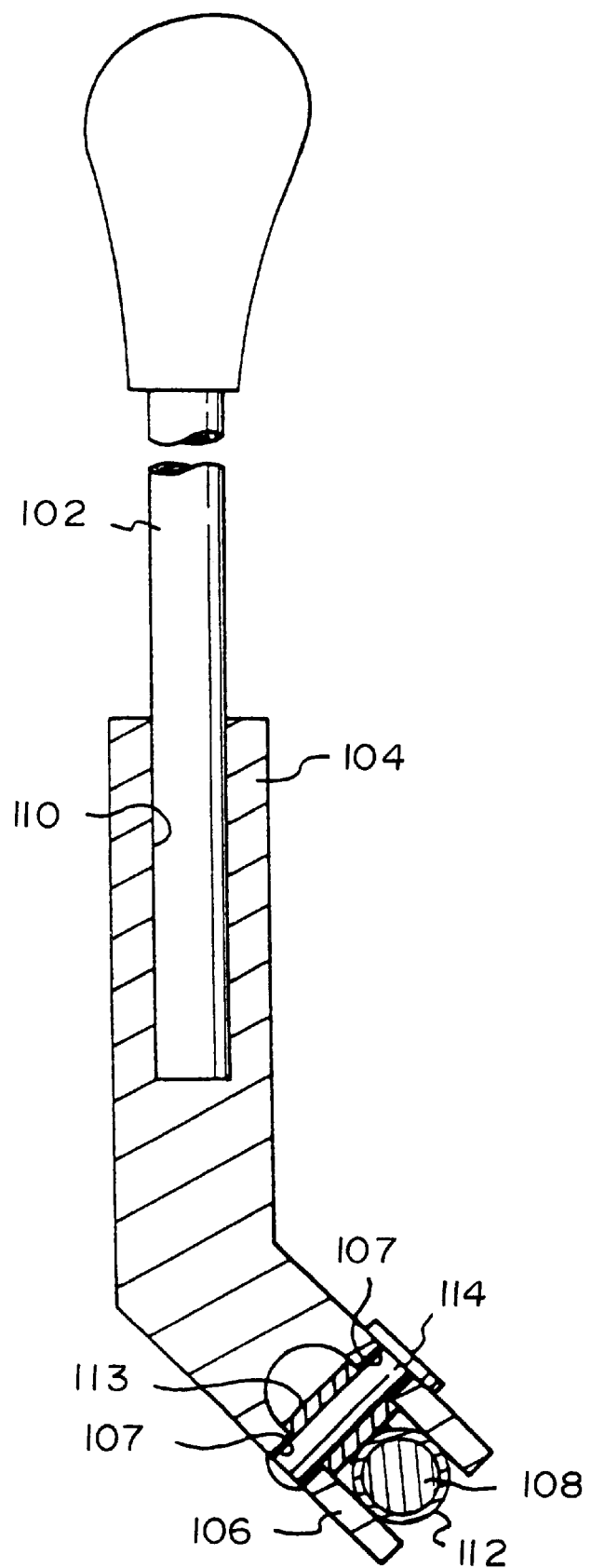
FIG. 4 is a cross sectional view which shows the main parts of the conventional shift lever apparatus.

When the shift lever 12 receives an impact in the axial direction greater than the predetermined value, the lower end of the shift lever 12 presses the ribs 24 downward, so that, as shown in FIG. 3, the shift lever 12 moves downward within the inserting hole 22 while cutting off the ribs 24. Since the shift lever 12 cuts off the ribs 24, the impact received by the shift lever 12 is absorbed.

Further, since the projecting height of the ribs 24 gradually increase nearer the lower end, the force necessary for cutting off the ribs 24 by the lower end of the shift lever 12 becomes larger nearer the lower portion. Accordingly, the shift lever 12 receives a large resistance to movement the further down the shift lever, so that the energy of impact can be gradually absorbed. Further, the motion of the shift lever 12 is completely stopped before the lower end of the shift lever 12 is brought into contact with the bottom portion of the inserting hole 22.

Next, operation of the shift lever apparatus 10 in accordance with the present embodiment will be described below.

In a normal state, as shown in FIG. 1A since the shift lever 12 is mounted at the upper end of the ribs 24, the shift lever 12 is operated so as to be rotated around the axial line (the direction of the arrow A) of the fixed axle 20, so that an optional shift can be selected.

When the shift lever 12 receives an impact force in the axial direction through a sudden reduction in vehicle speed, as shown in FIG. 3, the lower end of the shift lever 12 presses the ribs 24 downward, so that the shift lever 12 cuts off the ribs 24 and moves downward. Accordingly, the impact force applied to the shift lever 12 can be absorbed.

Since a plurality (four in the present embodiment) of ribs 24 project in the peripheral direction of the inserting hole 22 at a predetermined interval, the load of the shift lever 12 is uniformly divided.

Further, in the ribs 24, since the projecting height is gradually increased toward the lower end, the shift lever 12 moving downward within the inserting hole 22 while cutting off the ribs 24 receives a larger resistance against the movement in accordance with going downward, and the movement of the shift lever 12 is stopped in due course.

Still further, the lever holder 14 is substantially bent at the central portion and the axial line of the shift lever 12 is shifted from the retainer 18 and the fixed axis 20. Accordingly, the impact force applied to the shift lever 12 is neither transmitted to the retainer 18 nor to the fixed axle 20.

In the present embodiment, four ribs 24 are formed in the peripheral direction of the inserting hole 22 at predetermined intervals. However, the number of the ribs 24 is not limited to this. The magnitude of the energy of the impact force able to be absorbed can be easily changed by increasing or decreasing the number of the ribs 24 by means of adjustment of the interval between the ribs 24.

Furthermore, the shift lever apparatus of the present invention is not limited to a floor shift type which is provided in the center console of an automotive vehicle. For example, it may be an instrument panel shift type which is provided in an instrument panel and the like.

What is claimed is:

1. A shift lever apparatus for operating a transmission of a vehicle comprising:

(a) a shift lever to which operating force from a driver of the vehicle is inputted;

(b) a lever holder rotatably supported on the vehicle so as to be connected to said transmission and to which said shift lever is mounted; and (c) a rib disposed between said shift lever and the lever holder for deforming in response to the application of an axial force of a preselected magnitude on the shift lever so as to absorb said force, wherein said shift lever and the lever holder are structured such that one of either said lever or said lever holder is inserted into a hole provided in the other of said lever or said lever holder, said rib is provided within said hole, and said hole defames an inner wall and terminates in a bottom wall, and said rib radially projects from the inner wall of said hole.

2. A shift lever apparatus according to claim 1, wherein a radially projecting height of said rib from the inner wall of the hole varies along an axial direction of the shift lever.

3. A shift lever apparatus according to claim 2, wherein said rib has a substantially triangular shape when seen from a direction perpendicular to the axis of the shift lever.

4. A shift lever apparatus according to claim 2, wherein said rib comprises a plurality of ribs around the axis of the hole.

5. A shift lever apparatus according to claim 4, wherein said ribs are disposed in a symmetrical manner around the axis of the hole.

6. A shift lever apparatus according to claim 1, wherein said rib is formed such that width dimensions decrease toward the center of the hole and has a substantially triangular shape as seen from the axial direction of the shift lever.

7. A shift lever apparatus according to claim 1, wherein said lever is offset from an axial supporting center of the lever holder to the vehicle, so that an impact force acting on the shift lever does not directly act on said axial supporting center.

8. A shift lever apparatus for operating a speed change of a transmission of a vehicle comprising:

(a) a lever holder rotatably supported on the vehicle;

(b) a shift lever inserted and fixed in a hole formed on the lever holder; and (c) a rib projecting from an inner periphery of the hole formed on said lever holder, wherein the rib is deformed in response to the application of an axial impact force applied to the shift lever so as to absorb said force.

9. A shift lever apparatus according to claim 8, wherein said hole defines an inner wall, and the projecting height of said rib from the inner wall of the hole varies along an axial direction of the shift lever and has a substantially triangular shape as seen from a direction perpendicular to the axis of the shift lever.

10. A shift lever apparatus according to claim 8, wherein said rib comprises a plurality of ribs formed around the axis of the hole.

11. A shift lever apparatus according to claim 8, wherein said ribs are disposed around the axis of the hole in a symmetrical manner.

12. A shift lever apparatus according to claim 8, wherein said rib tapers toward the center of the hole and has a substantially triangular shape when seen from an axial direction of the shift lever.

13. A shift lever apparatus according to claim 8, wherein an extending line of the center line of said hole is disposed in a shifted manner from the axial supporting center of the lever holder to the vehicle, so that the impact force acting on the shift lever does not directly act on said axial supporting portion.

14. A shift lever apparatus comprising:

(a) a lever holder rotatably supported on a vehicle;

(b) a shift lever inserted and fixed to a hole formed on the lever holder; and (c) a plurality of deforming ribs, each of which has a front end projecting from an inner periphery of the hole formed on said lever holder, wherein a distance between front ends of the ribs located on different sides of said inner periphery is set to be smaller than an outer diameter of the shift lever, said ribs being deformed by the shift lever so as to absorb a load applied on the shift lever when the shift lever receives a load in an axial direction above a predetermined magnitude.

15. A shift lever apparatus according to claim 14, wherein said hole defines an inner wall, and a projecting radial height of said ribs from the inner wall of the hole varies along an axial direction of the shift lever, and wherein said ribs have a substantially triangular shape as seen from an axial perpendicular direction of the shift lever.

16. A shift lever apparatus according to claim 14, wherein said front ends of said ribs taper toward the center of the hole and have a substantially triangular shape when seen from an axial direction of the shift lever.

17. A shift lever apparatus according to claim 14, wherein said shift lever is offset from an axial supporting center of the lever holder to the vehicle, so that the impact force acting on the shift lever does not directly act on said axial supporting center.

* * * * *